United States Patent [19]

Schultz et al.

[11] Patent Number: 5,657,097

[45] Date of Patent: Aug. 12, 1997

[54] METHOD AND APPARATUS FOR GENERATING A PEAKING SIGNAL

[75] Inventors: Mark A. Schultz, Carmel, Ind.; Mark C. Elbert, Frederick, Md.

[73] Assignee: SGS-Thomson Microelectronics S.A., Saint Genis, France

[21] Appl. No.: 584,015

[22] Filed: Jan. 11, 1996

[30] Foreign Application Priority Data

Jan. 13, 1995 [FR] France ................ 95 00602

[51] Int. Cl.$^6$ .................................. H04N 5/208
[52] U.S. Cl. ............ 348/627; 348/623; 327/315; 327/319; 327/327; 382/273
[58] Field of Search ............... 348/618, 606, 348/622, 623, 625, 627, 678; 382/270, 273; 327/309, 310, 318, 315, 319, 321, 322, 327; H04N 5/208

[56] References Cited

U.S. PATENT DOCUMENTS

| 4,080,627 | 3/1978 | Wheeler | 358/162 |
| 4,263,616 | 4/1981 | Lee | 348/627 |
| 4,438,454 | 3/1984 | Shanley, II | 348/623 |
| 4,441,121 | 4/1984 | Harwood et al. | 348/623 |
| 4,536,796 | 8/1985 | Harlan | 348/627 |
| 4,839,725 | 6/1989 | Ueda | 358/160 |
| 4,857,779 | 8/1989 | Harlos et al. | 348/627 |

OTHER PUBLICATIONS

French Search Report from French Patent Application 95 00602, filed Jan. 13, 1995.

*Primary Examiner*—John K. Peng
*Assistant Examiner*—Jeffrey S. Murrrell
*Attorney, Agent, or Firm*—Wolf, Greenfield & Sacks, P.C.; James H. Morris

[57] ABSTRACT

A coring circuit for an input signal in the form of a differential input current having two components in phase opposition. A first pair of cascode transistors biased by a first reference voltage applies a first fraction of each of the components of the differential current to respectively first and second resistors. A second pair of cascode transistors biased by the first reference voltage provides a second fraction of each of the components of the differential current to a differential current output of the coring circuit and respectively to first and second branches of a differential stage that also receives voltages across the first and second resistors. Two coring current sources respectively connect first and second outputs of the differential stage to a supply voltage and are connected to each other through a third resistor.

25 Claims, 4 Drawing Sheets

METHOD AND APPARATUS FOR GENERATING A PEAKING SIGNAL

BACKGROUND OF THE INVENTION

1. Field of the Invention

The present invention relates to a peaking/depeaking circuit for accentuating the outlines of the objects in a television picture, or on the contrary, for attenuating the outlines. The present invention more particularly relates to a coring circuit for disabling the peaking when the level of the signal to process is too low.

2. Discussion of the Related Art

FIG. 1 is a functional diagram of a conventional peaking/depeaking circuit. In this circuit, a signal Y, generally a television luminance signal is delayed a first time by a delay circuit 10 and delayed a second time by a delay circuit 11. A circuit 13 provides a signal D2 that is twice the output Y2 of delay circuit 10 minus signal Y and the output Y3 of delay circuit 11. As indicated in FIG. 1, if signal Y is a square pulse, signal D2 has, at the beginning of the square pulse, a negative pulse immediately followed by a positive pulse and, at the end of the square pulse, a positive pulse immediately followed by a negative pulse.

Signal D2 is applied to the input of an attenuator 15, which multiplies signal D2 by a coefficient 0.125, and to the input of an attenuator 16 which multiplies signal D2 by a coefficient 0.375. The output DP of attenuator 15 is provided to a subtractor 18 which subtracts signal DP to the output of attenuator 16 which is previously processed by a coring circuit 20 and by a multiplier 22. The coring circuit 20 transmits at its output P the output signal of attenuator 16 only if this signal exceeds a predetermined level fixed by a coring signal C. Multiplier 22 multiplies the output P of the coring circuit 20 by a coefficient fixed by a gain signal G.

An adder 24 receives the output of subtractor 18 and the delayed luminance signal Y2, and provides the processed signal Yp.

Signal DP, which is a depeaking signal, is permanently subtracted from signal Y2, whereas signal P, which is a peaking signal, is more or less amplified, depending upon the gain signal G provided to multiplier 22, and added to signal Y2. If the multiplication coefficient of multiplier 22 is lower than ⅓, the subtraction of signal DP is dominant, and signal Yp has, as indicated in A, progressive step-form rising and falling edges. In contrast, if the multiplication coefficient of multiplier 22 exceeds ⅓, the addition of signal P is dominant. Then, signal Yp has, as indicated in B, a rising edge preceded by a negative pulse and followed by an overshot, and a falling edge preceded by an overshot and followed by a negative pulse.

Up to now, the functions of the block diagram of FIG. 1 have been achieved with elements operating in voltage mode.

SUMMARY OF THE INVENTION

An object of the present invention is to provide a peaking/depeaking circuit, and more particularly a coring circuit, of a particularly simple structure.

In embodiments of the present invention, some functions, shown in FIG. 1, are achieved in a particularly simple way, due to a specific structure formed with elements operating in current mode.

Embodiments of the invention more particularly relate to a coring circuit for an input signal in the form of a differential input current having two components in phase opposition. The coring circuit comprises a first pair of cascode transistors biased by a same reference voltage, for applying a first fraction of the components of the differential current to first two respective resistors; a second pair of cascode transistors biased by this reference voltage, for providing a second fraction of the components of this differential current to a differential current output of the circuit and to two respective branches of a differential stage receiving the voltages across the first resistors; and two coring current sources which respectively connect two transistors forming the differential stage to a supply voltage, the two coring current sources being interconnected through a second resistor.

According to an embodiment of the invention, the ratio between the value of the second resistor and the value of the first resistors is twice the ratio of the first and second fractions.

A peaking/depeaking circuit according to one embodiment of the invention comprises the above-mentioned coring circuit; a third pair of cascode transistors biased by the reference voltage, for injecting a third fraction of the components of the differential current respectively into an input branch and an output branch of a current mirror; and a differential multiplier receiving a differential multiplication voltage and the differential current output of the coring circuit, two output branches of the multiplier being respectively connected to the branches of the current mirror.

According to an embodiment of the invention, the differential input current of the coring circuit is obtained from an input voltage, this input voltage delayed once and this input voltage delayed twice. A differential stage receives the voltage of the output branch of the current mirror and the input voltage delayed once, the two branches of this differential stage being respectively connected to the input and output branches of the current mirror. The voltage of the output branch of the current mirror constitutes the output signal of the peaking/depeaking circuit.

According to an embodiment of the invention, the differential input current of the coring circuit is provided by two parallel connected output branches of two differential stages, one of which receives the input voltage and the input voltage delayed once, the other stage receiving the input voltage delayed once and the input voltage delayed twice.

The foregoing and other objects, features, aspects and advantages of the invention will become apparent from the following detailed description of illustrative embodiments of the present invention when taken in conjunction with the accompanying drawings.

DETAILED DESCRIPTION

Figure 1:
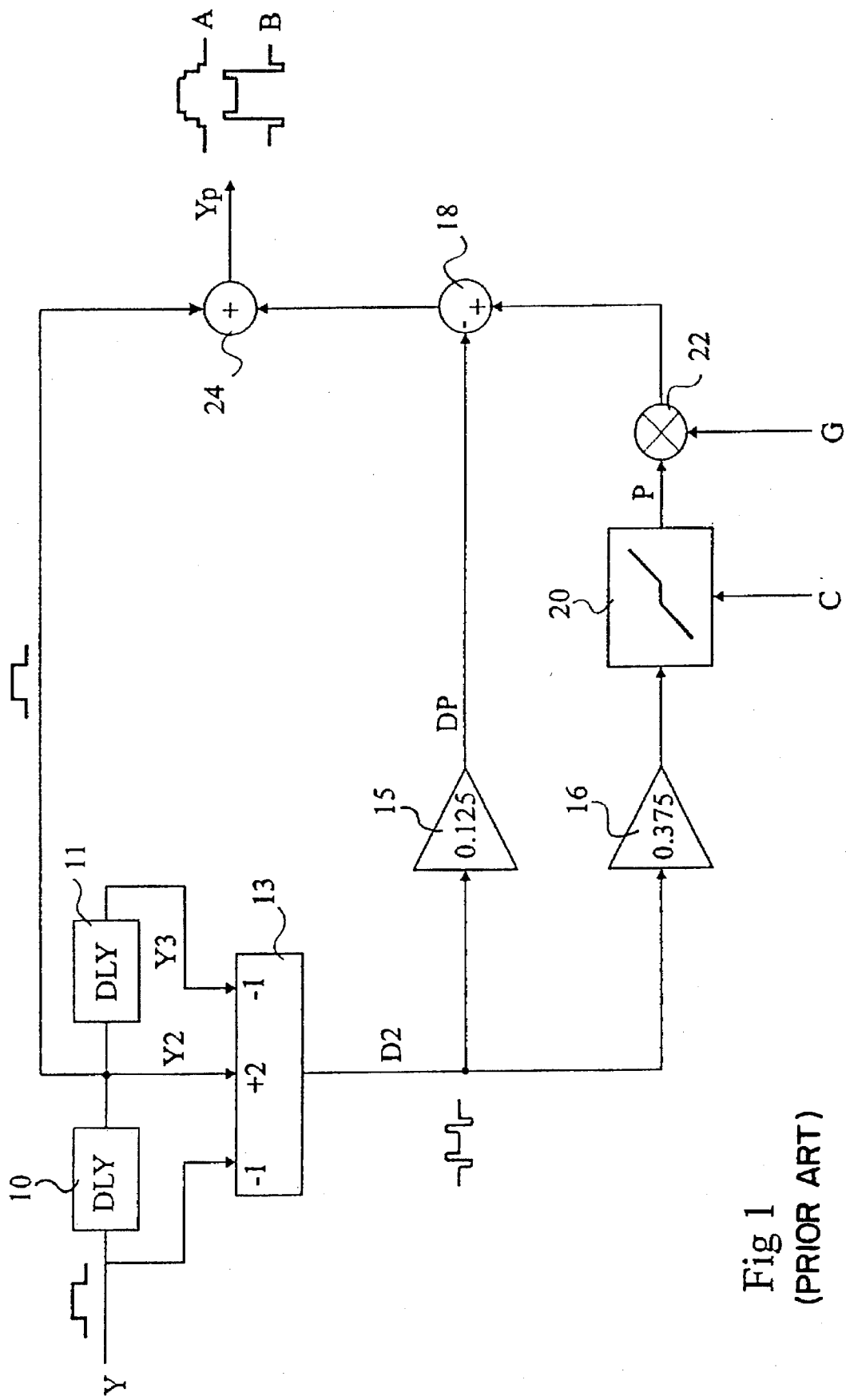
FIG. 1, above described, represents a conventional functional diagram of a peaking/depeaking circuit.

According to the invention, the signal D2 of FIG. 1 is in the form of a differential current having components D2+ and D2−. From this signal D2−/D2+, all the other signals are processed as differential currents until the output voltage Yp is provided.

Figure 2:
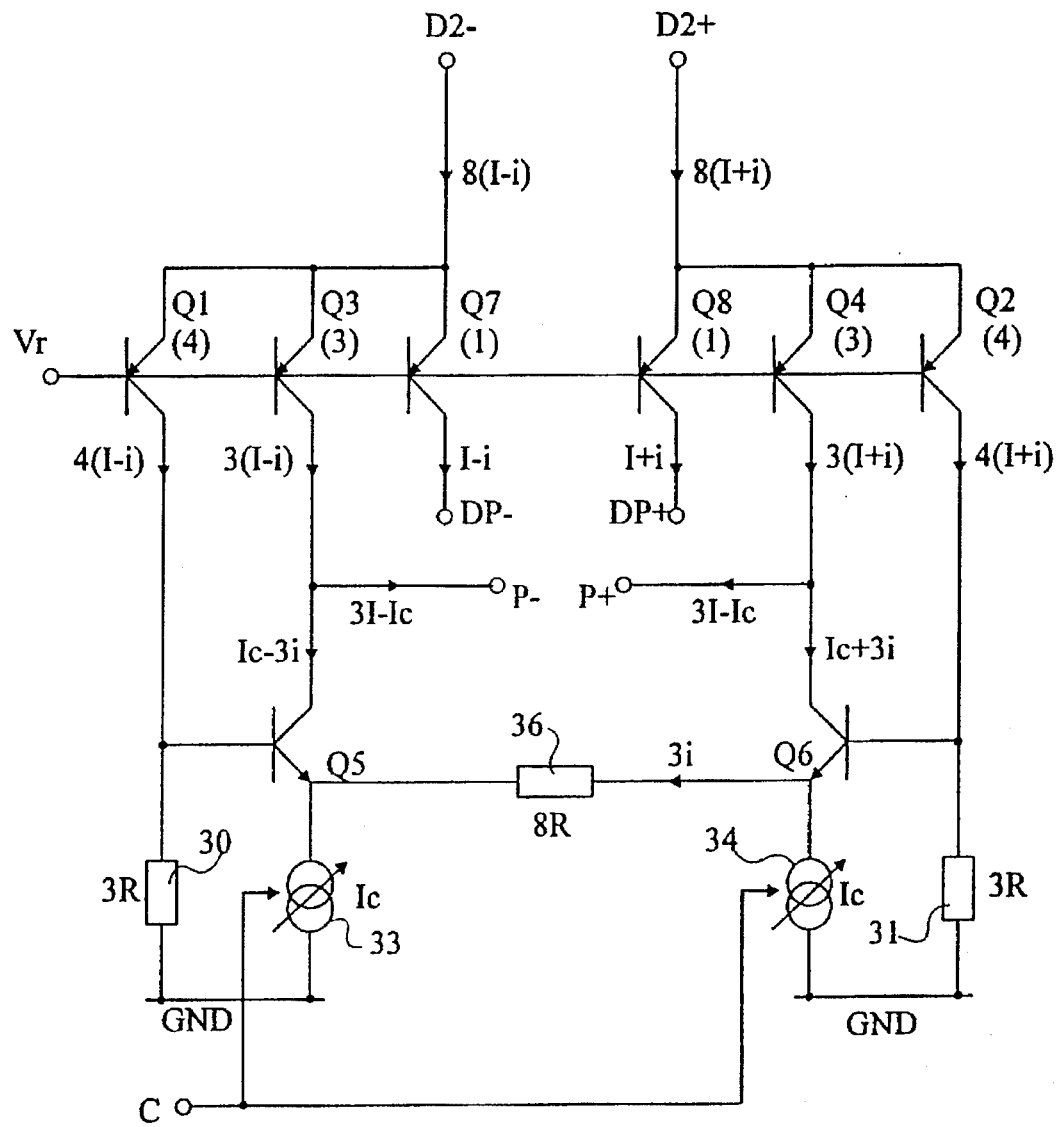
FIG. 2 represents an embodiment of a coring circuit according to one embodiment of the present invention.

FIG. 2 represents an embodiment of a coring circuit according to the invention. It is in particular the specific structure of the coring circuit according to the invention that provides a significant simplification of the peaking/depeaking circuit.

A pair of PNP cascode transistors Q1 and Q2 transmits a fraction of the differential current D2−/D2+ to two resistors 30 and 31. The bases of transistors Q1 and Q2 are biased by a constant reference voltage Vr. Transistors Q1 and Q2 receive respectively on their emitters the components D2− and D2+, and their collectors are connected to ground GND through resistors 30 and 31, respectively.

A second pair of PNP cascode transistors Q3 and Q4 transmits a fraction of the differential current D2−/D2+ to the respective branches of a differential stage formed by two NPN transistors Q5 and Q6. Transistors Q3 and Q4 are connected in parallel by their emitters and their bases to transistors Q1 and Q2. The collectors of transistors Q5 and Q6 are respectively connected to the collectors of transistors Q3 and Q4 and respectively provide the components P− and P+ of a differential current which corresponds to the peaking signal P of FIG. 1. The bases of transistors Q5 and Q6 are connected to the collectors of transistors Q1 and Q2, respectively. The differential stage Q5, Q6 is a low gain stage; for this purpose, the emitters of transistors Q5 and Q6 are connected to ground through respective current sources 33 and 34, and connected to each other through a resistor 36. The current Ic of sources 33 and 34, i.e., a coring current which can be adjusted by a signal C, determines the width of the coring range of signal D2+/D2−, i.e., the amplitude of signal D2+/D2− below which the output P+/P− of the circuit is zero.

A pair of PNP cascode transistors Q7 and Q8 transmits a fraction of the differential current D2−/D2+ as a differential current DP−/DP+ which corresponds to the depeaking signal DP of FIG. 1. Transistors Q7 and Q8 are connected in parallel by their bases and their emitters to transistors Q1 and Q2, respectively, and the collectors of transistors Q7 and Q8 provide the components DP− and DP+. The cascode transistors Q1–Q4 and Q7, Q8 distribute the currents of components D2− and D2+ as a function of the sizes of these transistors. Thus, the attenuation coefficients of attenuators 15 and 16 of FIG. 1 are obtained by selecting transistors Q3 and Q4 three times larger than transistors Q7, Q8, and transistors Q1 and Q2 four times larger than transistors Q7 and Q8. The relative sizes of these transistors are indicated in brackets in FIG. 2.

Thus, if components D2− and D2+ have values 8(I−i) and 8(I+i), respectively, (where I is a constant quiescent current, and i is a variable current representative of signal D2), currents 4(I−i), 4(I+i), 3(I−i), 3(I+i), I−i, and I+i circulate respectively in the collectors of transistors Q1–Q4 and Q7 and Q8. The collector currents of transistors Q1 and Q2 generate voltages across resistors 30 and 31. The difference between voltages across resistors 30 and 31 is applied to the terminals of resistor 36. In the example of FIG. 2, resistors 30 and 31 have a value 3R and resistor 36 has a value 8R. With these values, there is a current 3i in resistor 36, provided that this current 3i is lower than the current Ic of source 33 or 34. Then, the collector current of transistor Q5 has a value of Ic−3i, and the collector current of transistor Q6 has a value of Ic+3i. As a result, the components P− and P+ each have a value 3I−Ic, which is independent of i; the differential current P+/P− is zero for any value of i. This operation mode is obtained within a "coring" range.

Generally, the differential current P+/P− is canceled in the coring range by selecting the ratio between the value of resistor 36 and the value of resistors 30 and 31 equal to twice the size ratio between transistors Q1 (or Q2) and Q3 (or Q4). otherwise, the differential current P+/P− will vary with a slight positive or negative slope.

Now, if current 3i in resistor 36 tends to exceed value Ic (goes outside the coring range), the excess current cannot be absorbed by source 33. Thus, in the example of FIG. 2, the collector current of transistor Q5 is zero and the collector current of transistor Q6 establishes at 2Ic, independently of the value of current i, provided that it is higher than Ic/3. Then, the component P− establishes at 3(I−i) and the component P+ establishes at 3(I+i)−2Ic.

Figure 3:
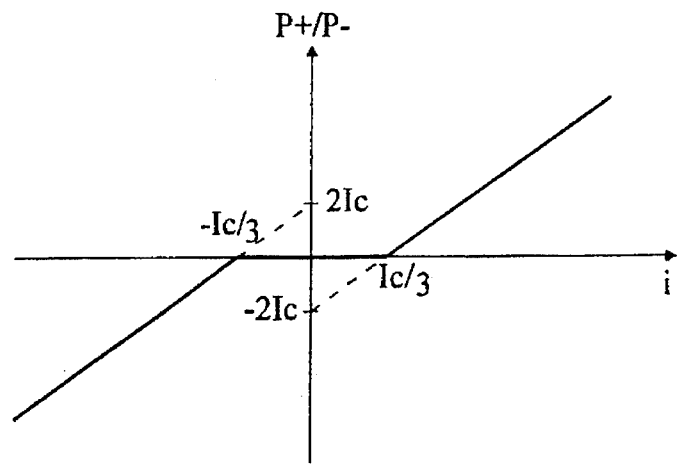
FIG. 3 represents a transfer diagram illustrating the operation of the circuit of FIG. 2.

FIG. 3 illustrates the variation of the differential current P+/P− as a function of current i. Between values −Ic/3 and Ic/3 of current i (within the coring range), the current P+/P− is zero. Beyond value Ic/3, current P+/P− varies according to a straight which intersects the vertical axis at a point −2Ic. Below value −Ic/3, current P+/P− varies according to a straight which intersects the vertical axis at a point 2Ic.

If the ratio between the value of resistor 36 and the value of resistors 30 and 31 differs from twice the size ratio between transistors Q1 and Q3 (or Q2 and Q4), the slope of signal P+/P− within the coring range becomes positive or negative instead of being zero, which is undesirable. Such a slope variation cannot occur in a circuit according to the invention when the temperature varies or when the fabrication technology changes, because the above-mentioned ratios are determined by elements of same nature (resistors or transistors) which have identical variation characteristics as a function of the temperature or the fabrication technology. In addition, these ratios are easy to achieve accurately in integrated technology.

Figure 4:
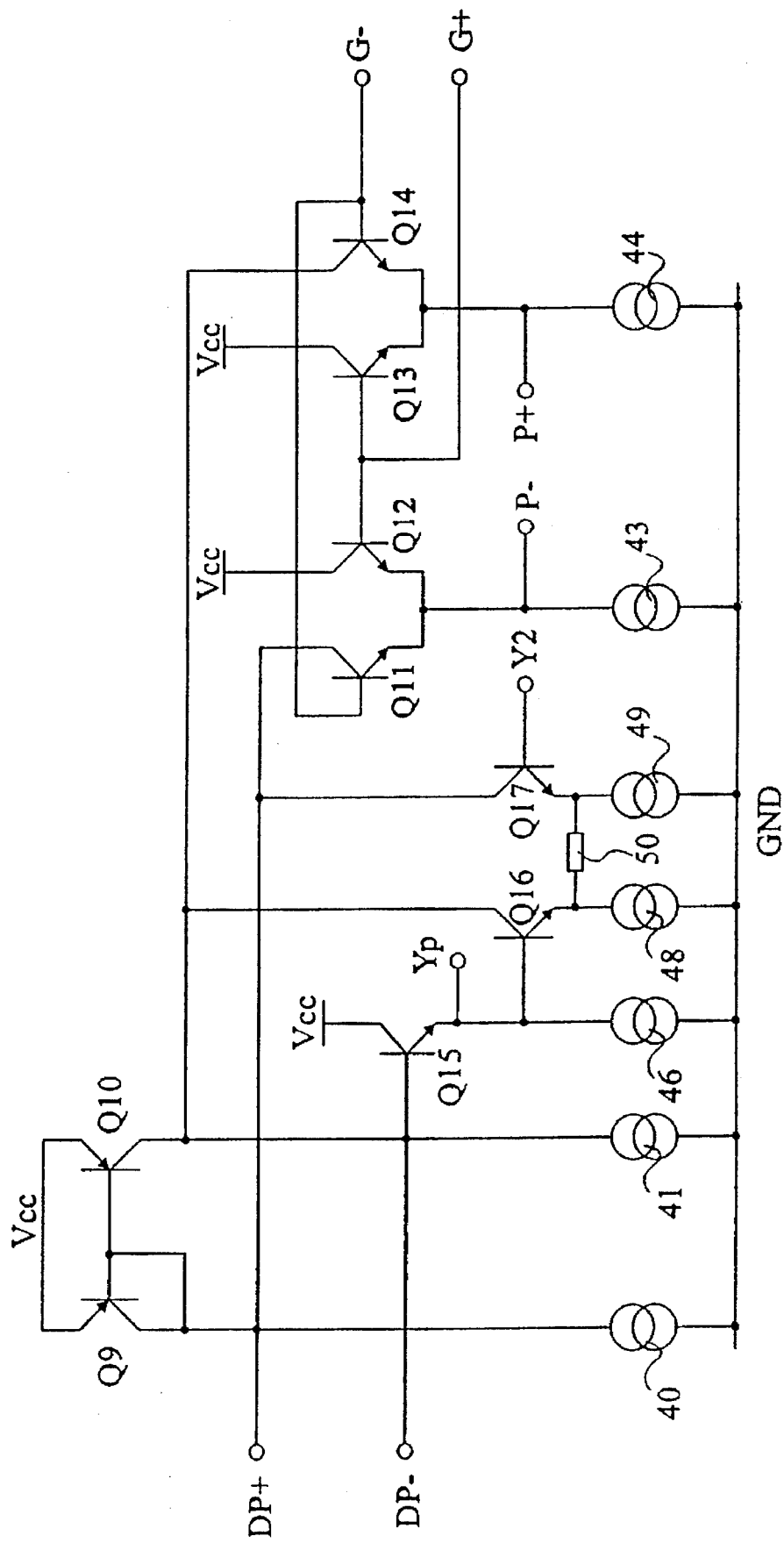
FIG. 4 represents circuitry to add to the coring circuit of FIG. 2 to realize a peaking/depeaking circuit.

FIG. 4 represents an embodiment using the circuit of FIG. 2 for realizing a peaking/depeaking circuit according to the invention. The components DP+ and DP− drawn from the collectors of transistors Q7 and Q8 are provided to an input branch and an output branch, respectively, of a current mirror including PNP transistors Q9 and Q10. The emitters of transistors Q9 and Q10 are connected to a high supply voltage Vcc. The collectors of these transistors, which form the input and output branches of the current mirror, are connected to ground GND through respective current sources 40 and 41 of same value. The bases of transistors Q9 and Q10 are connected to each other and are connected to the collector of transistor Q9.

The components P− and P+ are injected in two biasing branches of two respective differential stages forming a multiplier. One stage comprises two NPN transistors Q11 and Q12, and the other stage comprises two NPN transistors Q13 and Q14. The emitters of transistors Q11 and Q12, receiving the component P−, are connected to ground GND through a current source 43. The emitters of transistors Q13 and Q14, receiving the component P+, are connected to ground GND through a current source 44 of same value as source 43. The collectors of transistors Q12 and Q13 are connected to voltage Vcc and their bases receive a component G+ of a differential control voltage G+/G− which determines the multiplication coefficient of the multiplier. Transistors Q11 and Q14 receive at their bases the component G− and their collectors are connected to the input branch and to the output branch of the current mirror Q9, Q10, respectively.

With this configuration, the difference between the differential output current of the multiplier (provided by the collectors of transistors Q11 and Q14) and of the differential current DP+/DP− is obtained on the input and output branches of mirror Q9, Q10. The functions of multiplier 22 and of subtractor 18 of FIG. 1 are thus achieved.

In addition, the output voltage Yp of the peaking/depeaking circuit is provided by a follower transistor Q15 which receives at its base the voltage of the output branch of the current mirror Q9, Q10 (i.e., the collector voltage of transistor Q10). Transistor Q15 has its collector connected to voltage Vcc and its emitter, which provides voltage Yp, connected to ground through a current source 46. Voltage Yp and a voltage Y2, which corresponds to the delayed signal Y2 of FIG. 1, are applied to the bases of transistors Q16 and Q17, which form a low gain differential stage. The emitters of transistors Q16 and Q17 are connected to ground by respective current sources 48 and 49 of same value and that are connected to each other through a resistor 50. The collectors of transistors Q16 and Q17 are connected to the input branch and output branch of the current-mirror Q9, Q10. This differential stage provides the function of the adder 24 of FIG. 1.

To ensure that transistors Q7 and Q8 (FIG. 2) are constantly conductive, NPN cascode transistors (not shown) biased by voltage Vr can be connected between transistors Q9 and Q10 and terminals DP+ and DP−. This also isolates multiplier Q11–Q14 from transistors Q7 and Q8, and thus allows to bias the multiplier with a different voltage.

Figure 5:
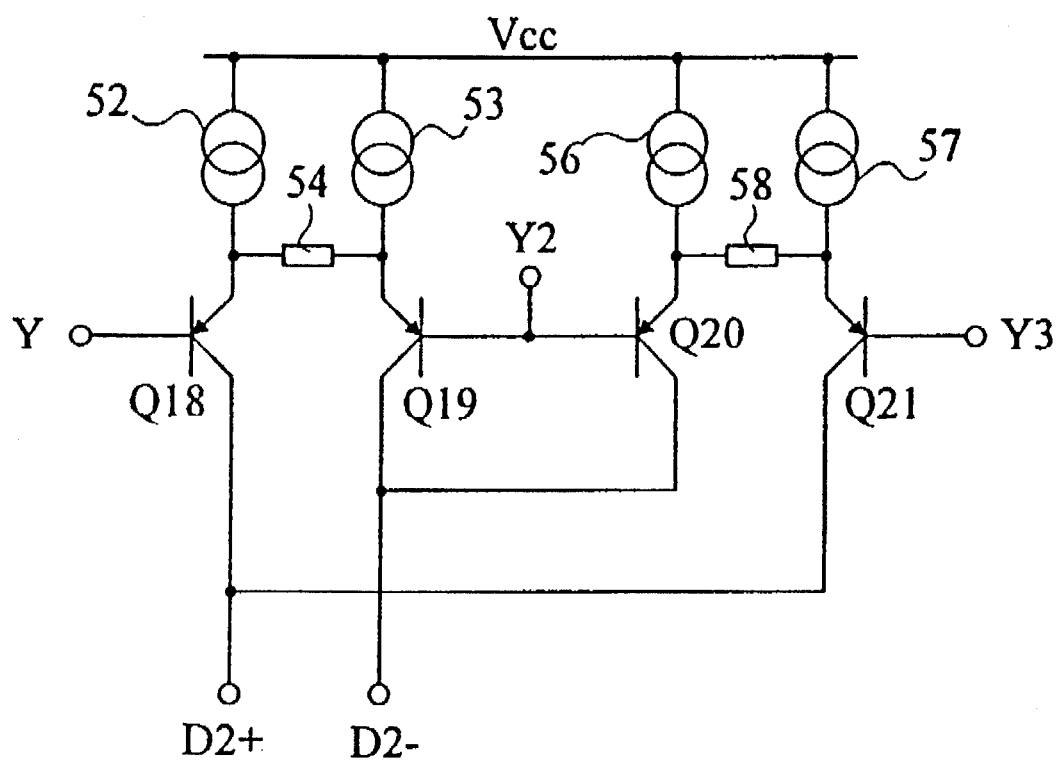
FIG. 5 represents an embodiment of a circuit for providing a current signal required by the circuits of embodiments of the present invention.

FIG. 5 represents an embodiment of a circuit providing the differential current D2+/D2− from voltages Y, Y2 and Y3 of FIG. 1. The output branches of two low gain differential stages are connected in parallel and provide components D2+ and D2−, respectively. One of the stages comprises PNP transistors Q18 and Q19 whose emitters are connected to voltage Vcc through respective current sources 52 and 53 of same value, and are connected to each other through a resistor 54. The other differential stage comprises PNP transistors Q20 and Q21 whose emitters are connected to voltage Vcc through respective current sources 56 and 57 of same value as sources 52 and 53, and are connected to each other through a resistor 58 of same value as resistor 54. The collectors of transistors Q18 and Q21 provide the component D2+ and the collectors of transistors Q19 and Q20 provide the component D2−. The bases of transistors Q18 and Q21 receive voltages Y and Y3, respectively, and the bases of transistors Q19 and Q20 both receive voltage Y2.

A complete peaking/depeaking circuit according to the present invention, achieved from elements operating in current mode, comprises approximately 55 transistors and 41 resistors, whereas conventional circuits using elements operating in voltage mode and furthermore not comprising the depeaking function, include approximately 75 transistors and 48 resistors.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A coring circuit having first and second differential outputs and having first and second inputs for receiving first and second differential input signals having first and second input currents in phase opposition, the coring circuit comprising:

a first pair of cascode transistors including first and second cascode transistors, biased by a first reference voltage, having first terminals respectively coupled to the first and second inputs of the coring circuit and second terminals that provide respectively a first fraction of the first and second input currents;

first and second resistors, the first resistor being coupled between the second terminal of the first cascode transistor and a second reference voltage, the second resistor being coupled between the second terminal of the second cascode transistor and the second reference voltage;

a second pair of cascode transistors including third and fourth cascode transistors, biased by the first reference voltage, having first terminals respectively coupled to the first and second inputs of the coring circuit and second terminals that provide respectively a second fraction of the first and second input currents;

a differential stage including first and second transistors having first terminals respectively coupled to the second terminals of the third and fourth cascode transistors and to the first and second differential outputs of the coring circuit, having second terminals, and having third terminals respectively coupled to the second terminals of the first and second cascode transistors;

first and second coring current sources respectively coupled between the second terminal of the first and second transistors of the differential stage and the second reference voltage; and a third resistor coupled between the second terminals of the first and second transistors of the differential stage.

2. The coring circuit of claim 1, wherein a ratio between a resistance value of the third resistor and resistance values of each of the first and second resistors is twice a ratio of the first and second fractions.

3. A peaking/depeaking circuit comprising:

a coring circuit having first and second differential outputs and having first and second inputs for receiving first and second differential input signals having first and second input currents in phase opposition, the coring circuit including:

a first pair of cascode transistors including first and second cascode transistors, biased by a first reference voltage, having first terminals respectively coupled to the first and second inputs of the coring circuit and second terminals that provide respectively a first fraction of the first and second input currents;

first and second resistors, the first resistor being coupled between the second terminal of the first cascode transistor and a second reference voltage, the second resistor being coupled between the second terminal of the second cascode transistor and the second reference voltage;

a second pair of cascode transistors including third and fourth cascode transistors, biased by the first reference voltage, having first terminals respectively coupled to the first and second inputs of the coring circuit and second terminals that provide respectively a second fraction of the first and second input currents;

a differential stage including first and second transistors having first terminals respectively coupled to the second terminals of the third and fourth cascode transistors and to the first and second differential outputs of the coring circuit, having second terminals, and having third terminals respectively coupled to the second terminals of the first and second cascode transistors;

first and second coring current sources respectively coupled between the second terminal of the first and second transistors of the differential stage and the second reference voltage; and a third resistor coupled between the second terminals of the first and second transistors of the differential stage;

a third pair of cascode transistors including fifth and sixth cascode transistors, biased by the first reference voltage, having first terminals respectively coupled to the first and second inputs of the coring circuit and second terminals that provide respectively a third fraction of the first and second input currents;

a current mirror circuit having an input and an output respectively coupled to the second terminals of the fifth and sixth cascode transistors; and a differential multiplier having a first input that receives a differential multiplication voltage, and second and third inputs respectively coupled to the first and second outputs of the coring circuit, the differential multiplier also having first and second output branches respectively connected to the input and the output of the current mirror.

4. The peaking/depeaking circuit of claim 3, wherein the peaking/depeaking circuit receives a voltage signal, a first delayed voltage signal that is obtained by providing a first delay to the voltage signal, and a second delayed voltage signal that is obtained by providing a second delay to the voltage signal, wherein the differential input signal of the coring circuit is derived from the voltage signal, the first delayed voltage signal and the second delayed voltage signal, the peaking/depeaking circuit further comprising a first differential stage having a first input coupled to the output of the current mirror circuit and a second input that receives the first delayed voltage signal, and wherein a voltage at the output of the current mirror constitutes an output signal of the peaking/depeaking circuit.

5. The peaking/depeaking circuit of claim 4, further comprising second and third differential stages each having first and second inputs and first and second outputs, the first and second input of the second differential stage respectively receiving the input voltage signal and the first delayed input voltage signal, the first and second inputs of the third differential stage respectively receiving the first delayed input voltage signal and the second delayed input voltage signal, the first output of the second differential stage being coupled to the second output of the third differential stage and the first input of the coring circuit to provide the first differential input signal, the second output of the second differential stage being coupled to the first input of the third differential stage and the second input of the coring circuit to provide the second input differential signal.

6. The peaking/depeaking circuit of claim 3, wherein a ratio between a resistance value of the third resistor and resistance values of each of the first and second resistors of the coring circuit is twice a ratio between the first and second fractions.

7. The peaking/depeaking circuit of claim 3, wherein each of the coring current sources has a control input that receives a control signal for controlling a drive current of each of the first and second coring current sources.

8. The coring circuit of claim 1, wherein each of the coring current sources has a control input that receives a control signal for controlling a drive current of each of the first and second coring current sources.

9. A method for providing a peaking signal comprising steps of:

receiving first and second differential input signals having respectively first and second current values;

generating first and second fractional signals respectively having third and fourth current values equal to the first and second current values multiplied by a first ratio;

generating third and fourth fractional signals respectively having fifth and sixth current values equal to the first and second current values multiplied by a second current ratio;

generating first and second differential output signals from the first, second, third and fourth fractional signals, each of the differential output signals having a current value equal to zero when an absolute value of a difference between the first and second current values is less than a threshold level.

10. The method of claim 9, wherein the step of generating the first and second differential output signals includes a step of generating first and second output differential signals having a current value proportional to the absolute value of the difference between the first and second current values when the absolute value of the difference is greater than the threshold level.

11. The method of claim 10, further comprising a step of multiplying the first and second differential output signals by a first set gain value.

12. The method of claim 11, further comprising steps of:

multiplying the first and second differential input signals by a second set gain value to generate first and second depeaking signals; and combining the first and second depeaking signals with the first and second output differential signals and a delayed voltage signal to generate an output processed signal.

13. A circuit for providing a peaking and a depeaking signal comprising:

a coring circuit having first and second inputs that receive first and second differential input signals having respectively first and second current values;

a first pair of transistors including first and second transistors each having a first terminal that respectively receives the first and second differential input signals, second terminals that provide respectively first and second fractional signals having third and fourth current values equal to the first and second current values multiplied by a first ratio, and third terminals coupled to a voltage reference source;

a second pair of transistors including third and fourth transistors each having a first terminal that respectively receives the first and second input differential signals, second terminals that provide respectively third and fourth fractional signals having third and fourth current values equal to the first and second current values multiplied by a second ratio, and third terminals coupled to a voltage reference source;

means for generating first and second differential output signals from the first, second, third and fourth fractional signals, each of the differential output signals having a current value equal to zero when an absolute value of a difference between the first and second current values is less than a threshold level.

14. The circuit of claim 13, wherein the means for generating the first and second differential output signals includes means for generating first and second differential signals output having a current value proportional to the absolute value of the difference between the first and second current values when the absolute value of the difference is greater than the threshold level.

15. The circuit of claim 14, further comprising a multiplier coupled to the means for generating that receives the first and second differential output signals and multiplies the first and second differential signals by a set gain value to provide at first and second outputs of the multiplier first and second peaking signals.

16. The circuit of claim 15, further comprising a third pair of transistors including fifth and sixth transistors each having a first terminal that respectively receives the first and second input differential signals, second terminals that provide respectively fifth and sixth fractional signals having fifth and sixth current values equal to the first and second current values multiplied by a third ratio, and third terminals coupled to a voltage reference source.

17. The circuit of claim 16, further comprising a current mirror circuit having an input and an output respectively coupled to the second terminals of the fifth and sixth transistors, the input and output of the mirror circuit also being respectively coupled to the first and second outputs of the multiplier.

18. The circuit of claim 17, further comprising a first differential stage having a first input coupled to the output of the current mirror, a second input that receives a first delayed voltage signal, and an output that provides one of a peaking and a depeaking signal.

19. The circuit of claim 18, further comprising second and third differential stages each having first and second inputs and first and second outputs, the first and second inputs of the second differential stage respectively receiving a voltage signal and the first delayed voltage signal, the first and second inputs of the third differential stage respectively receiving the first delayed voltage signal and a second delayed voltage signal, the first output of the second differential stage being coupled to the second output of the third differential stage and the first input of the coring circuit to provide the first differential input signal, the second output of the second differential stage being coupled to the first input of the third differential stage and the second input of the coring circuit to provide the second input differential signal.

20. The circuit of claim 14, wherein the circuit has a control input for receiving a control signal, and wherein the means for generating includes means for setting the threshold level based on the control signal.

21. The circuit of claim 13, further comprising a third pair of transistors including fifth and sixth transistors each having a first terminal that respectively receives the first and second input differential signals, second terminals that provide respectively fifth and sixth fractional signals having fifth and sixth current values equal to the first and second current values multiplied by a third ratio, and third terminals coupled to a voltage reference source.

22. A method of providing a peaking signal from a time-varying voltage signal, comprising steps of:

converting the time-varying voltage signal into a time-varying current signal;

receiving a coring signal;

coring a first portion of the current signal, based on the coring signal, to produce a peaking current signal; and combining the peaking current signal with a second portion of the current signal.

23. The method of claim 22, wherein the step of converting includes converting the time-varying voltage signal into a differential time-varying current signal.

24. A circuit for providing a peaking signal from a time-varying voltage signal, the circuit comprising:

a converter that converts the time-varying voltage signal into a time-varying current signal;

a first amplifier having an input that receives a first portion of the time-varying current signal and an output that provides a first amplified current signal;

a coring circuit having a first input that receives a coring signal, a second input that receives the first amplified current signal and an output that provides a peaking current signal;

a second amplifier having an input that receives a second portion of the time-varying current signal and an output that provides a second amplified current signal; and a combiner having first and second inputs that respectively receive the peaking current signal and the second amplified current signal and an output that provides a combined signal.

25. The peaking circuit of claim 24, wherein the time-varying current signal, the first amplified current signal, the second amplified current signal and the peaking current signal are differential signals.

* * * * *